Patented July 29, 1930

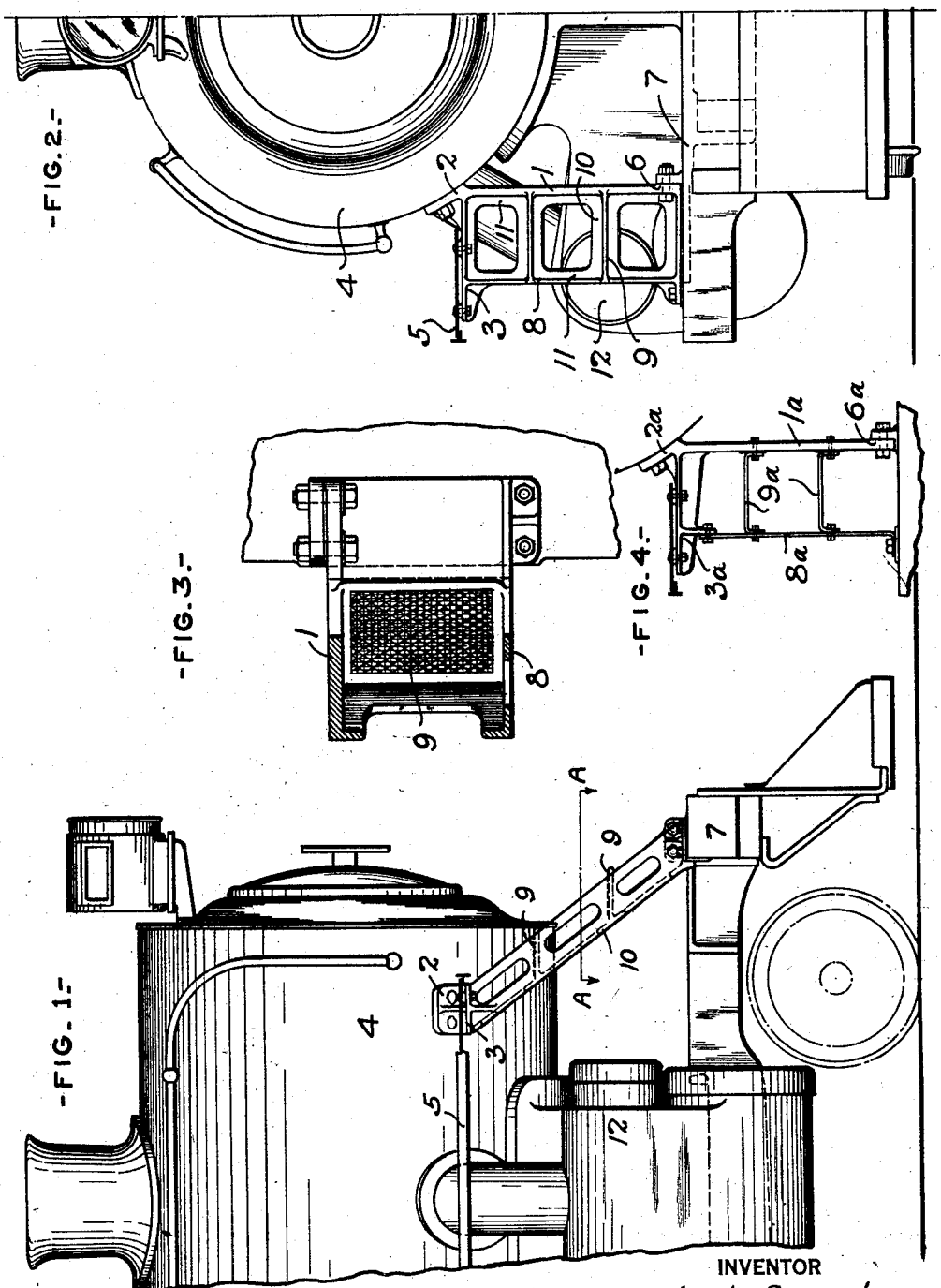

1,771,423

UNITED STATES PATENT OFFICE

LESTER SPANGENBERG, OF CLIFTON, NEW JERSEY

LOCOMOTIVE BUMPER BRACE

Application filed May 2, 1929. Serial No. 359,745.

This invention relates to bumper braces applied between the bumpers and smoke boxes of locomotives.

The object of the invention is to provide a bumper brace, steps, and run board supporting bracket of simpler, safer, and more efficient form than has heretofore existed and to permit the removal and application of the same as a unit in place of the multi-part construction now commonly used.

Locomotives are now commonly of such large size that parts formerly accessible directly from the bumper of the locomotive, such as the headlight and run boards, cannot now be reached without the use of supplementary steps or footholds. It is usual to apply a brace from the bumper to the smoke box to strengthen and stiffen the locomotive structure; said brace commonly comprising a round bar provided with seats at either end for attachment by bolting or riveting to the smoke box and the bumper or brackets formed thereon. Steps enabling the attendant to reach the headlight or the run board are commonly clamped to such braces, but at best afford an insecure and dangerous foothold. The present invention aims to provide a secure and convenient foothold in a simplified and safer form of brace.

The improvement claimed is hereinafter fully set forth.

In the accompanying drawing: Fig. 1 is a side view in elevation of the front portion of a locomotive having a bumper beam, smoke box, run boards, and bumper brace; Fig. 2, a half front view in elevation of the same; Fig. 3, a plan view in section on the line A—A of Fig. 1 of the bumper brace; and, Fig. 4, a front view in elevation of a modified form of the bumper brace shown in Figs. 1 and 2.

In the practice of the invention, referring descriptively to the specific embodiment thereof which is herein exemplified, the body of the brace, 1, which serves as a thrust resisting means, has formed integrally with it, at its upper end, the seat, 2, adapted to be secured as shown or in any suitable manner to the smoke box, 4; and has also a horizontal laterally projecting integral member, 3, formed on it to provide a bracket for supporting a run board 5.

At the lower end of the brace 1 is also formed a seat 6 of any convenient form, adapted to be rigidly secured to the bumper 7, and while it is shown as secured to a lug formed on the bumper, it will be understood that the seat may be designed to be secured directly to the bumper, the lugs being dispensed with in manner as shown, for instance, on the left side of the device as viewed in Fig. 2. A side bar, 8, in spaced relation to the brace 1 and parallel therewith, extends from the run board bracket 3 to the bumper 7. Connecting the brace 1 and the side bar 8 are transverse horizontal step forming members 9, forming, together with the brace 1, the side bar 8 and the bracket 3, a stair or ladder by means of which the run board 5 is made the more readily accessible from the bumper 7; the transverse members 9 forming in effect steps or treads of such stair.

Strengthening and stiffening the structure is accomplished by means of the flanged risers 10 associated with the treads 9, and the flanges 11 formed on the brace 1 and the side bar 8; the whole formed as a unitary structure combining the functions of a smoke box brace and a stair or ladder affording access and passage between the run board 5 and the bumper 7, a similar structure being preferably employed on each side of the locomotive.

In certain special forms of locomotives the steam chests 12 are located so far ahead that a brace as described supra might interfere with the withdrawal of the valves from said steam chest, and in that event, a modified form of the invention, as illustrated in Fig. 4, may be used.

In such alternative construction the brace 1ª, the seats 2ª and 6ª, and the bracket 3ª are formed integral as before described, but the side bar 8ª, and the steps or treads 9ª are formed separate and detachable as shown. Thus in locomotives where the valve chest is close to the ladder the removal of the piston valve therefrom may be facilitated by the temporary removal of the side bar 8ª and the treads 9ª, permitting the valve to be drawn forward. If desired the treads 9ª may be made integral with the side bar 8ª and in fact the invention contemplates forming the parts as an integral structure, a composite structure, or part integral and part composite as the exigencies of any particular instance warrants.

It will be seen by those familiar with the art, that the combined brace and ladder herein described greatly simplifies construction by eliminating the independent run board bracket commonly used, with its attendant additional holes in the smoke box, and liability for leakage resulting therefrom.

The invention claimed and desired to be secured by Letters Patent is:

1. In a bumper brace for locomotives, a seat adapted for fastening to a bumper beam; a seat adapted for fastening to a smoke box; thrust-resisting means joining the seats; and a run board supporting bracket.

2. In a bumper brace for locomotives, a seat adapted for fastening to a bumper beam; a seat adapted for fastening to a smoke box; thrust-resisting means joining the seats; a run board supporting bracket; means joined to said run board supporting bracket for connecting same to said bumper beam, and spaced from said thrust-resisting means; and means joining the thrust-resisting means and said spaced means to form steps.

3. A bumper brace for locomotives comprising a brace adapted for connection to a bumper beam and a smoke box, and having a run board supporting bracket formed integrally therewith; a side bar joined to said run board supporting bracket for connecting same to said bumper beam; and step members interposed between the brace and the side bar to form a ladder.

4. A bumper brace for locomotives comprising a brace adapted for connection to a bumper beam and a smoke box; a run board supporting bracket; a side bar; and step members between said brace and said side bar, all formed as a unitary casting.

5. A combination device of the character described for locomotives, which comprises a brace adapted for connection to a bumper beam, and a smoke box; a run board supporting bracket; and a plurality of steps extending laterally from the brace, all being formed as an integral structure.

6. A bumper brace for locomotives comprising a brace adapted for connection to a bumper beam and a smoke box, and having formed integrally therewith a run board supporting bracket; a side bar; step members and risers; and lateral flanges on said brace and said side bar, all being formed as an integral structure.

LESTER SPANGENBERG.